United States Patent
Ohkawa

(10) Patent No.: US 8,270,030 B2
(45) Date of Patent: Sep. 18, 2012

(54) IMAGE PROCESSING APPARATUS AND METHOD FOR CONVERTING IMAGE DATA INTO A SPECIFIED RESOLUTION

(75) Inventor: Satoshi Ohkawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 755 days.

(21) Appl. No.: 11/979,957

(22) Filed: Nov. 13, 2007

(65) Prior Publication Data

US 2008/0117468 A1   May 22, 2008

(30) Foreign Application Priority Data

Nov. 13, 2006   (JP) .................................. 2006-306841

(51) Int. Cl.
    *G06K 15/00* (2006.01)
(52) U.S. Cl. .......... 358/3.07; 358/1.2; 358/1.5; 358/1.9; 358/1.15; 358/412; 358/474; 358/497; 358/449
(58) Field of Classification Search ........................ None
    See application file for complete search history.

(56) References Cited

U.S. PATENT DOCUMENTS

| | | | | |
|---|---|---|---|---|
| 5,901,278 A * | 5/1999 | Kurihara et al. | ............. | 358/1.15 |
| 6,449,396 B1 * | 9/2002 | Loce et al. | ..................... | 382/276 |
| 6,728,425 B1 * | 4/2004 | Tokuyama et al. | ........... | 382/299 |
| 7,126,709 B2 * | 10/2006 | Moriyama et al. | ........... | 358/1.15 |
| 7,158,268 B2 * | 1/2007 | Boyd | ............................. | 358/474 |
| 7,532,348 B2 * | 5/2009 | Yaguchi | ....................... | 358/1.15 |
| 7,573,597 B2 * | 8/2009 | Futami | ......................... | 358/1.16 |
| 7,746,523 B2 * | 6/2010 | Kim | ................................ | 358/498 |
| 7,796,287 B2 * | 9/2010 | Fukuta | ......................... | 358/1.15 |
| 7,872,775 B2 * | 1/2011 | Edwards et al. | ............... | 358/1.2 |
| 2004/0114172 A1 * | 6/2004 | Ohyama et al. | .............. | 358/1.13 |
| 2004/0263884 A1 * | 12/2004 | Arai et al. | ....................... | 358/1.9 |
| 2004/0263890 A1 * | 12/2004 | Kawamoto et al. | .......... | 358/1.13 |
| 2005/0024666 A1 * | 2/2005 | Ohyama et al. | .............. | 358/1.13 |
| 2005/0046881 A1 * | 3/2005 | Tone et al. | ..................... | 358/1.9 |
| 2005/0280841 A1 * | 12/2005 | Bossut et al. | .................. | 358/1.2 |
| 2005/0280857 A1 * | 12/2005 | Sugiyama et al. | ........... | 358/1.13 |
| 2006/0209317 A1 * | 9/2006 | Shoda et al. | ................... | 358/1.2 |
| 2006/0215204 A1 * | 9/2006 | Miyamoto et al. | ........... | 358/1.13 |
| 2006/0262329 A1 * | 11/2006 | Fujimori | ........................ | 358/1.2 |
| 2007/0058219 A1 * | 3/2007 | Yamaguchi | .................... | 358/497 |
| 2007/0139668 A1 * | 6/2007 | Wen et al. | ....................... | 358/1.9 |

FOREIGN PATENT DOCUMENTS

| | | |
|---|---|---|
| JP | 2001-251522 | 9/2001 |
| JP | 3285941 | 3/2002 |
| JP | 3647347 | 2/2005 |
| JP | 2005-117290 | 4/2005 |

\* cited by examiner

*Primary Examiner* — Dung Tran

(74) *Attorney, Agent, or Firm* — Harness, Dickey & Pierce, P.L.C.

(57) ABSTRACT

Example embodiments are directed to an apparatus and method of image processing. Moving speed control processing performed by a control unit causes an image reading portion to move the position of a reading line in a sub-scanning direction of a document, to read an image on the document in the main scanning direction, and to output the image data on the read line. A read image correction portion converts the image data characteristics to data characteristics that are predetermined at the time of accumulation of the image data, and accumulates the converted image data. Then, an image processing portion converts the accumulated image data characteristics into device characteristics of a device to which the image data is output, and outputs the converted image data to an image writing portion or to the device to which the image data is output, via an external I/F control unit.

12 Claims, 6 Drawing Sheets

IMAGE PROCESSING APPARATUS AND METHOD FOR CONVERTING IMAGE DATA INTO A SPECIFIED RESOLUTION

PRIORITY STATEMENT

This application claims benefit of priority under 35 U.S.C. §119 from Japanese Patent Application No. 2006-306841 filed on Nov. 13, 2006, in the Japanese Patent Office, the disclosure of which is incorporated herein by reference in its entirety.

BACKGROUND OF THE INVENTION

1. Field of the Invention

The present invention relates to an image processing apparatus such as a computer, a copying machine, a scanner, a printer, a facsimile device, and a complex machine thereof, and to an image processing method.

2. Description of the Related Art

Due to the developments of line sensor reading devices constituted by CCD units or writing devices using laser beams, copying machines are making the transition from analog to digital copying machines in which digitalized image data are processed. Such digital copying machines came to be called "digital complex machines (MFP)" since these machines are equipped with a variety of functions such as a copy function but also a scanner function, a printer function, and a facsimile function to perform multifunction control (see, for example, Japanese Unexamined Patent Publication No. 2001-223828).

An MFP is connected to a network and saves output data obtained from each function into a storage device such as an HDD provided within the device, so that the output data can be transmitted to and received from the outside through the network (see, for example, Japanese Unexamined Patent Publication No. 2001-251522).

The MFPs used in an office have been diversified. For example, a small MFP is installed next to a personal computer (PC) so as to be paired with the PC, and a worker using the PC can readily use the copy function, the scanner function, the printer function and the facsimile function thereof. Also, a medium-sized MFP is shared by a group of people in a department or a division, and a certain level of productivity of the MFP, a sort function, a punch function, a staple function and the like of the MFP can be used. Furthermore, a large MFP is used in a department providing copy-related services in a company, or a company conducting a copy-related business itself, and is capable of providing high productivity and high-quality multiple functions.

As described above, the MFPs that are classified into a wide range of classes from a small size class to a large size class as described above have the functions that can be shared in each class, thus strong demands are expected for some of the functions in each class. For example, in the large MFP, post-processing is requested to be performed on papers obtained after the punching, stapling, folding or other plotting processing, or electronic filing is requested to be performed simultaneously with copying, while in the small MFP an excellent internet FAX function or PC-FAX function and, for personal use, a function to printing a high-quality image on a special paper are required.

In recent years, the importance of information value in businesses has been recognized, thus it is required that the information is sent promptly, accurately, securely, clearly and effectively. With new functions for effectively handling information that uses digital data has been provided because of the increase in speed of the communication technology, spread of the communication technology, increase in the volume of memories, reduction of the costs and size of the memories, and technical advantages in PCs, hence there is a demand for a new function and integration thereof into the MFPs that handle digital image data as a part of digital data.

Here, an output in the MFP means, as described above, an output to paper in the copy function, and transmission using electronic data in the scanner function or facsimile function. The output form when performing transmission using electronic data varies according to application. For example, when transmitting using a facsimile function, monochrome binary image data is transmitted, while when transmitting using a scanner function, for example, color RGB image data is transmitted.

In this manner, the MFP outputs image data using various functions, and output means of these functions have different output characteristics. For example, when outputting a paper, the characteristics of a writing unit are provided, and when performing scanner distribution, the characteristics of a display are provided.

Moreover, an output at a resolution determined in each output device, or an output at a resolution desired by an operator is requested. For example, a plotter is requested to output at a resolution of 600 dpi, while scanner distribution or a facsimile is requested to output at a resolution of 200 dpi.

However, a line sensor installed in a scanner unit or the like performs reading at a predetermined resolution, and needs to perform magnification processing on the read image data to obtain a desired resolution for output (see, for example, Japanese Unexamined Patent Publication H6-054176).

However, as described above, when using a line sensor installed in a scanner unit to perform reading at a predetermined resolution and performing magnification processing on the read image data to obtain a desired resolution for output, the original document had to be read out again if the resolution of image data to be output.

In order to avoid such duplication of the work, when performing reading at a fixed resolution, accumulating the image data, and thereafter changing the resolution of the accumulated image data, another problem arises in productivity when performing such single operation.

Technologies relating to the present invention are also disclosed in, e.g., Japanese Unexamined Patent Publication No. 2005-117290, Japanese Patent Application No. 3285941, and Japanese Patent Application No. 3647347.

SUMMARY OF THE INVENTION

The present invention was contrived in view of the above-mentioned points, and it is an object of the present invention to improve the productivity of image reading.

In an aspect of the present invention, an image processing image processing apparatus comprises a reading device for moving the position of a reading line in a sub-scanning direction of a document to read an image in a main scanning direction of the document and then to output image data on the read reading line; a moving speed control device for variably controlling a speed of the reading device moving in the sub-scanning direction of the document so that a resolution of the image data in the sub-scanning direction becomes a specified resolution; a first conversion device for converting characteristics of the image data output from the reading device into data characteristics predetermined at the time of accumulation of the image data; an accumulation device for accumulating the image data converted by the first conversion device; a second conversion device for converting the characteristics of the image data accumulated by the accumulation device into device characteristics of a device to which the image data is output; and an output device for outputting the image data converted by the second conversion device to the device to which the image data is output. The first conversion device is provided with primary resolution conversion device for converting the resolution of the image data in the main scanning direction or the sub-scanning direction into the specified resolution, and the second conversion device is provided with secondary resolution conversion device for converting the resolution of the image data in the main scanning direction or the sub-scanning direction into the specified resolution.

In another aspect of the present invention, an image processing method comprises a reading step of moving the position of a reading line in a sub-scanning direction of a document to read an image in a main scanning direction of the document and then to output image data on the read reading line; a moving speed control step of variably controlling a speed of moving in the sub-scanning direction of the document so that a resolution of the image data in the sub-scanning direction becomes a specified resolution in the reading step; a first conversion step of converting characteristics of the image data output in the reading step into data characteristics predetermined at the time of accumulation of the image data; an accumulation step of accumulating the image data converted in the first conversion step; a second conversion step of converting the characteristics of the image data accumulated in the accumulation step into device characteristics of a device to which the image data is output; and an output step of outputting the image data converted in the second conversion step to the device to which the image data is output. The first conversion step is provided with a primary resolution conversion step of converting the resolution of the image data in the main scanning direction or the sub-scanning direction into the specified resolution, and the second conversion step is provided with a secondary resolution conversion step of converting the resolution of the image data in the main scanning direction or the sub-scanning direction into the specified resolution.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Hereinafter, the present invention will be described in detail with reference to the drawings.

Figure 1:
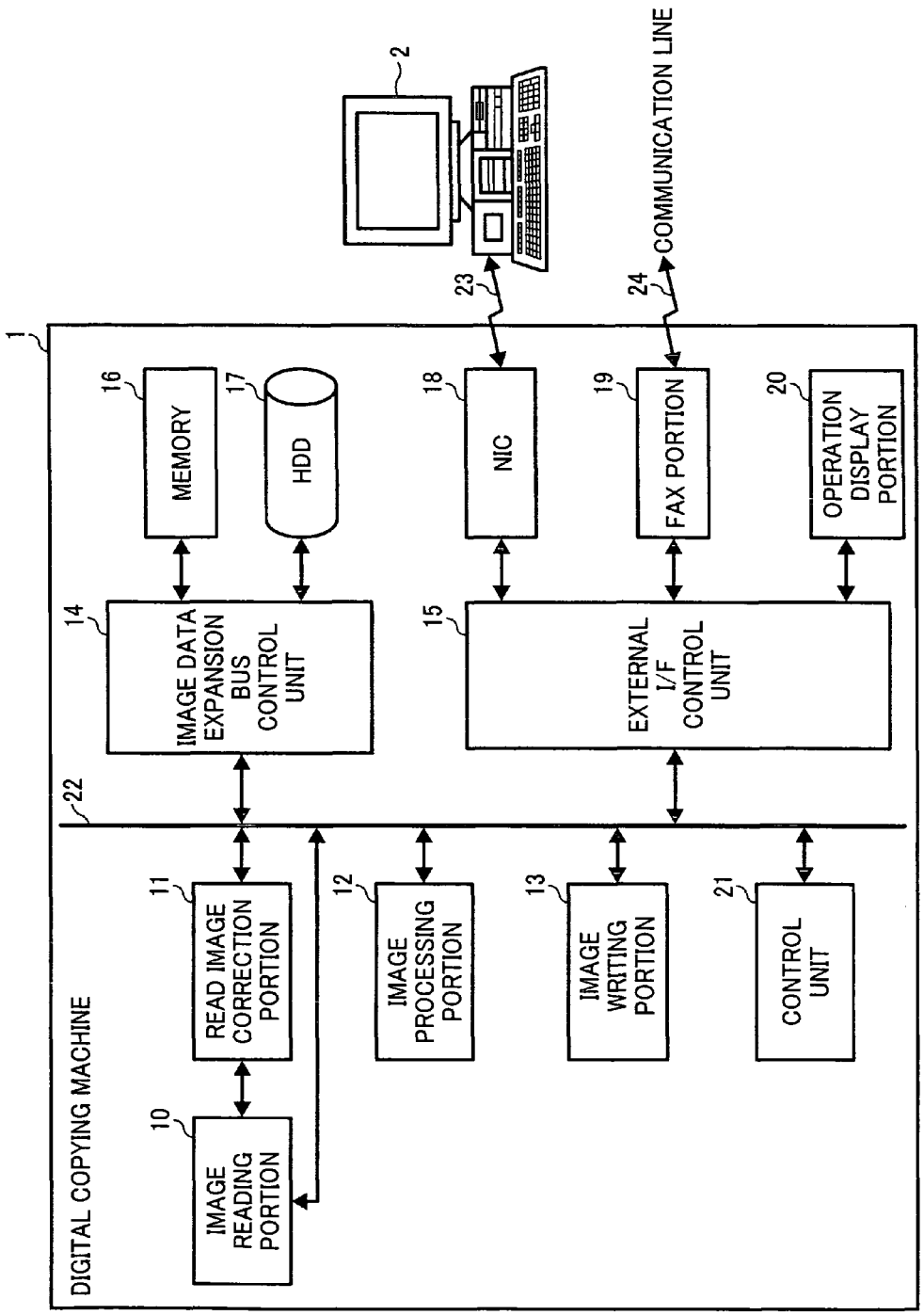
FIG. 1 is a block diagram showing the configuration of functions of a digital copying machine of an embodiment of the present invention.

FIG. 1 shows the configuration of functions of a digital copying machine of an embodiment of the present invention. This digital copying machine 1 is a complex machine (MFP) equipped with a copy function, a scanner function, a printer function, and a facsimile function, is connected to a computer (PC) 2 via a communication wire 23 or a network, and is connected via a communication line 24 so as to be able to perform facsimile communication (facsimile transmission/reception) via a communication network including a public line network.

The inside of the digital copying machine 1 is configured by an image reading portion 10, a read image correction portion 11, an image processing portion 12, an image writing portion 13, an image data expansion bus control unit 14, an external interface (I/F) control unit 15, a memory 16, a hard disk device 17, a network interface card (NIC) 18, a facsimile control unit (FAX portion) 19, an operation display portion 20, and an image data expansion bus 22. The PC 2, image writing portion 13, HDD 17, FAX portion 19 and operation display portion 20 are the devices to which image data is output.

The image reading portion 10 functions as the scanner function, reading means, and moving speed control means. The read image correction portion 11 functions as first conversion means and primary resolution conversion means. The HDD 17 functions as accumulation means. The image processing portion 12 functions as second conversion means and secondary resolution conversion means. The image processing portion 12 and external I/F control unit 15 function as output means. A control unit 21 functions as control means. The image reading portion 10 and image writing portion 13 function as the copy function. The image writing portion 13 functions as the printer function. The FAX portion 19 functions as the facsimile function. The control unit 21 and the like execute processing of each step.

Next, the detail of a series of processing from reading a document to printing and outputting the document when copying the document of the digital copying machine 1 is described.

First, the process from reading the document to outputting it onto a paper is described.

The image reading portion 10 has a line sensor configured by a CCD photoelectric conversion device, an A/D converter, and a drive circuit for driving these devices (illustration and detailed description of these devices are omitted since they are known devices). The image reading portion 10 also has an optical unit configured by a light source and a mirror (illustration and detailed description of this device is omitted since it is a known device), wherein the optical unit is caused to move on the position of a reading line in a sub-scanning direction of the document that is set on a reading position (on a contact glass, for example) by a user, to thereby read an image in a main scanning direction of the document and then output the read image data on the reading line.

When the speed of moving the optical unit in the sub-scanning direction of the document is made faster than a normal speed, the number of reading lines of the image data is reduced, whereby the resolution of the image data in the sub-scanning direction can be reduced to a specified resolution (reduction).

Furthermore, when the speed of moving the optical unit in the sub-scanning direction of the document is made slower than the normal speed, the number of reading lines of the image data is increased, whereby the resolution of the image data in the sub-scanning direction can be increased to a specified resolution (enlargement).

At this moment, if the optical unit is a color CCD, each of red (R), green (G) and blue (B) color resolving light beams is subjected photoelectric conversion to amplify it, and thus obtained each RGB color of 8-bit (may not be eight bits) red, green and blue electric image signals are sent to the read image correction portion 11 as the image data.

It should be noted that the document to be read is set in a reading position of the image reading portion 10 by the user, or documents on a document table are automatically fed one-by-one b an automatic document feeding device (ADF), not shown, and then set on the reading position, or alternatively the document to be read is simply caused to pass through the reading position by the ADF.

By variably controlling the speed of the document passing through the reading position, the resolution of the read image data can be increased or decreased as described above.

Furthermore, in the above explanation, the image data that is read by the image reading portion 10 has eight bits in each color, but the number of bits is not limited to this value.

The image data read by the image reading portion 10 is output to the read image correction portion 11. The read image correction portion 11 performs first conversion processing of converting the image data to a data characteristic that is determined beforehand when accumulating image data.

Figure 2:
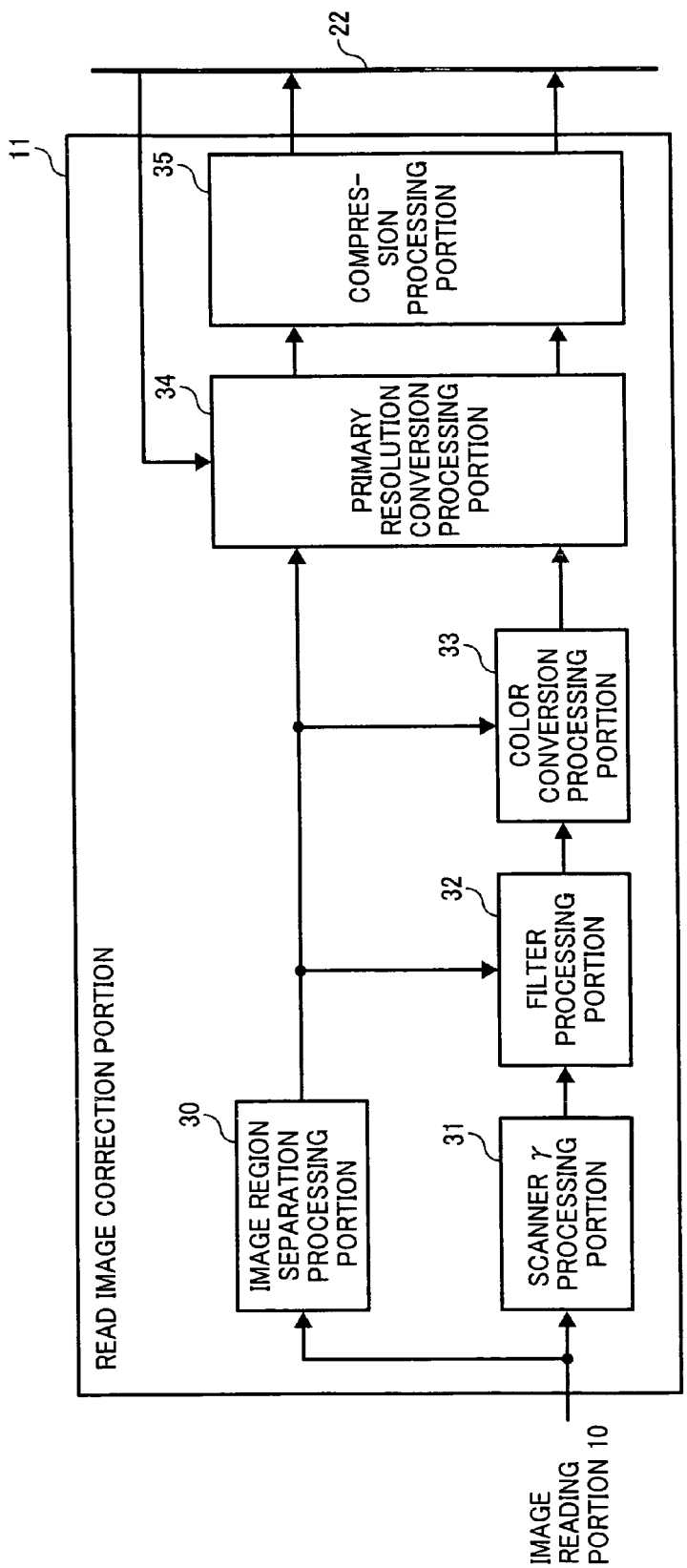
FIG. 2 is a block diagram showing the internal configuration of a read image correction portion of the digital copying machine.

The first conversion processing performed by the read image correction portion 11 is described in detail using FIG. 2.

First, the image data that is input to the read image correction portion 11 is sent to an image region separation processing portion 30 and a scanner γ processing portion 31. The image region separation processing portion 30 extracts a distinctive area of the document on the basis of the image data. For example, extraction of an area having dot portions formed by performing regular printing, extraction of an edge portion such as characters, determination on whether the image data is chromatic or achromatic, determination on whether a background image is white or not, and other processing are formed, and the results of extraction and determination (image region separation data) are output to a filter processing portion 32.

On the other hand, the scanner γ processing portion 31 performs image γ conversion to convert a γ characteristic of the image reading portion 10 to a characteristic to be output, and then outputs thus obtained characteristic to the filter processing portion 32. The filter processing portion 32 performs processing of converting spatial frequency of the image data sent from the scanner γ processing portion 31. Also, the filter processing portion 32 uses the image region separation data obtained from the image region separation processing portion 30, to perform distinctive filter processing on each of the extracted areas of the image data. For example, in the area in which dot portions are extracted, smoothing processing of smoothing an image having dots. In the area in which edge portions are extracted, if it is determined that the image within the extracted area has a white background, then the image within the extracted area is assumed to be a character portion, and thereby edge emphasizing processing of improving MTF characteristics is performed.

In this manner, the image data processed by the filter processing portion 32 is output to a color conversion processing portion 33. The color conversion processing portion 33 has a function capable of subjecting the image data to color conversion processing appropriate for an output characteristic. Since image formation for once accumulating image data is performed in this embodiment, in such a case the color conversion processing portion 33 performs RGB conversion on general RGB data or a predetermined space and outputs thus obtained data to a primary resolution conversion processing portion 34. Then, the primary resolution conversion processing portion 34 converts the resolution of the image data to a resolution appropriate for a subsequent device to which the image data is output, and outputs thus obtained resolution to a compression processing portion 35. Specifically, primary resolution conversion processing of converting the resolution of the image data in the main scanning direction or sub-scanning direction into a specified resolution is performed.

For example, when an image on the document is read at a resolution of 600 dpi in the main scanning direction and at a resolution of 300 dpi in the sub-scanning direction, and the data of this image needs to be output at a resolution of 300× 300 dpi, the resolution of the image is subjected to conversion processing by the primary resolution conversion processing portion 34 to obtain a desired resolution, and is then output. At this moment the conversion processing may be performed using known computation processing including three-dimensional convolution. Thereafter, by the compression processing portion 35, the image data which is an output obtained after color conversion processing and the image region separation data of the image region separation processing portion 30 are subjected to compression processing and then output to the image data expansion bus control unit 14 via the image data expansion bus 22.

At this moment, for the image data, an irreversible compression processing method including JPEG may be used, and, for the image region separation data obtained through image region separation processing, a reversible compression processing method needs to be used because the data relies on the positions of pixels.

The image data expansion bus control unit 14 once accumulates the image data and image region separation data received from the read image correction portion 11 into the HDD 17 via the memory 16.

It should be noted that the compression processing methods to be used are different for the image data and the data obtained as a result of extraction and determination, thus these data may be accumulated after being subjected to compression processing separately, but it is necessary to control and manage the dependence relationship of these data and handle these data together in subsequent processing.

Furthermore, the data may be once accumulated in the HDD 17 as long as the image data can be constantly sent to the image writing portion 13 including the plotter at the same timing while images are continuously read by the image reading portion 10. However, actually the image data is only input and cannot be output during output preparation, thus the volume of the image data might exceed the limited capacity of the memory 16. Sufficient capacity of the memory 16 is required, but it simply leads to the increase of costs of the hard drive. Therefore, the data are once accumulated in the HDD 17, which is a large capacity storage device, so that exceeding the memory capacity can be prevented.

Next is described second conversion processing that is performed by the image processing portion 12 to convert the characteristic of the image data into a device characteristic of a device to which the image data is output.

After accumulating in the HDD 17, the image data and image region separation data are transmitted to the image processing portion 12 via the memory 16, and the image processing portion 12 converts the characteristic of the image data accumulated in the HDD 17 into an image write characteristic for outputting a paper, e.g., a CMYK image characteristic if the image writing portion 13 is a color writing device.

Figure 3:
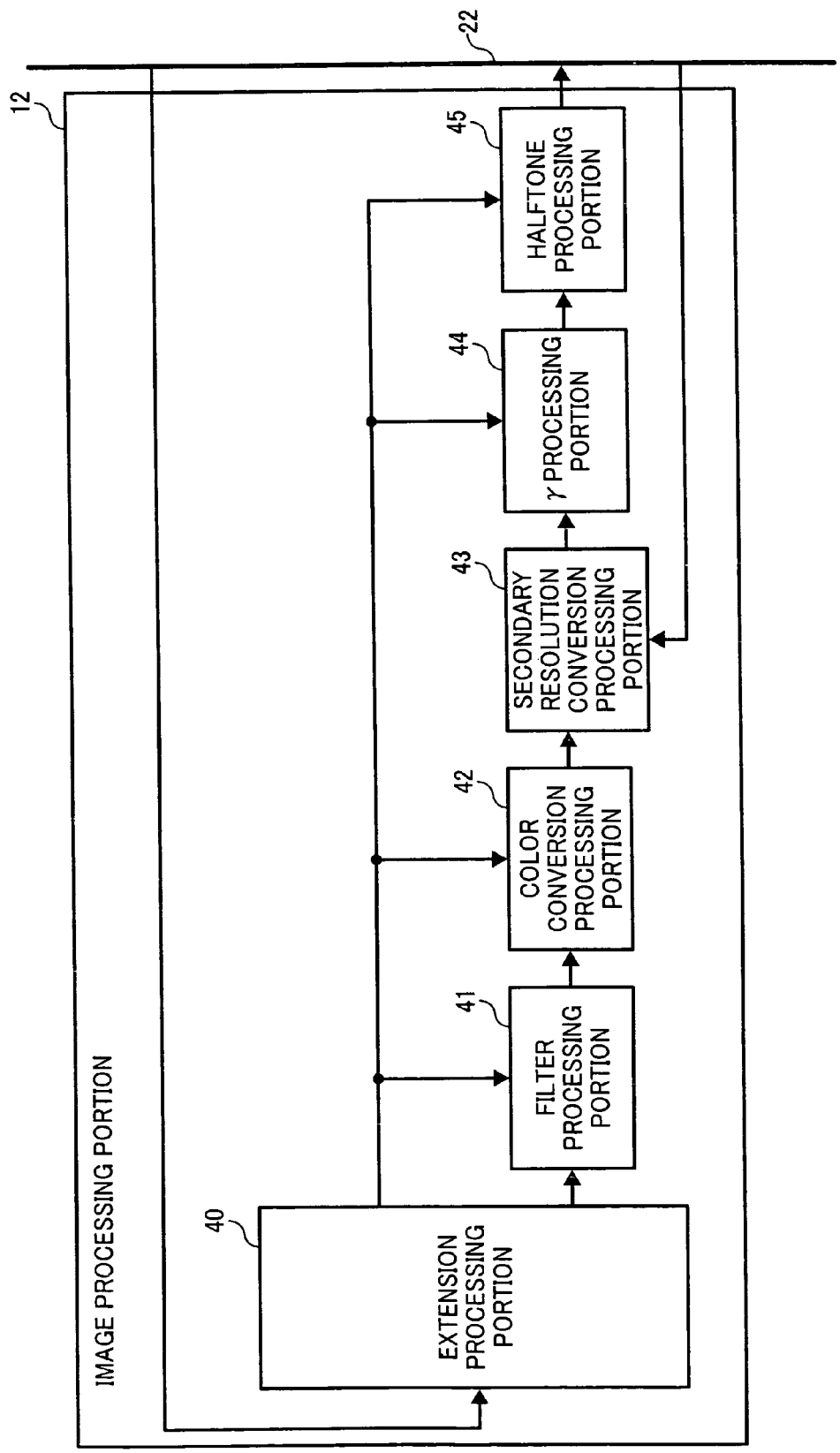
FIG. 3 is a block diagram showing the internal configuration of an image processing portion of the digital copying machine.

The detail of this processing is described using FIG. 3.

The data to be input to the image processing portion 12 includes the image data and the image region separation data. First, an extension processing portion 40 extends the image data and image region separation data that are compressed by the compression processing portion 35 of the read image correction portion 11. Then, a filter processing portion 41 performs filter processing on the image data in accordance with an MTF characteristic of the image writing portion 13.

In the abovementioned filter processing performed by the filter processing portion 32 of the read image correction portion 11, the characteristics of the data are corrected to predetermined data characteristics in order to be accumulated in the memory 16 or HDD 17, but in this case the filter processing portion 41 converts the predetermined data characteristics (accumulated image characteristics) to the data characteristic (image characteristic) of the image writing portion 13.

Moreover, distinctive conversion is performed using distinctive image region separation data of the document.

After processing is performed by the filter processing portion 41, the image data is sent to a color conversion processing portion 42. This color conversion processing portion 42 also uses the image separation data of the image separation processing portion 30 to, for example, assume that the letters of the image region separation data are black if the image data is achromatic, and to perform black single color processing when performing CMYK conversion based on the black letters.

The image signal processed by the color conversion processing portion 42 is subjected to arbitrary resolution conversion processing by a secondary resolution conversion processing portion 43 and thereafter sent to a γ processing portion 44, and then γ conversion for converting a predetermined accumulated image characteristic into an output characteristic. Specifically, secondary resolution conversion processing of converting the resolution of the image data in the main scanning direction or sub-scanning direction into a specified resolution is performed.

Furthermore, a halftone processing portion 45 uses the image data processed by the γ processing portion 44 to perform gradation processing in accordance with the characteristic of the image writing portion 13. For example, dither processing or error diffusion processing is performed. Also, converting the density of the gradation of the image writing portion 13 (number of bits) is also performed here. For example, when outputting 1-bit data, an input 8-bit signal is subjected to dither processing and made into 1-bit data.

In this manner, the image data processed by the image processing portion 12 is once input to the image writing portion 13 via the memory 16 and HDD 17 again. When digital image data composed of CMYK is received, the image corresponding to the image data that is received on a transfer sheet is printed out by means of an electrophotographic process using a laser beam.

Here, the data are transferred via the image data expansion bus 22 to each of the parts such as the read image correction portion 11, image processing portion 12 and image writing portion 13, whereby input and output are performed. At this moment, even if, for example, the image data processed by the image processing portion 12 is output by the image writing portion 13, paper output may not be prepared depending on the condition of the engine plotter in accordance with the timing at which the input and output are controlled. In such a case, the image data is once kept in the memory 16 or HDD 17. Also, the image data expansion bus 22 is shared by several modules and thus is controlled by the image data expansion bus control unit 14 adjusting the input and output.

Here, the abovementioned storage devices are connected to the image data expansion bus control unit 14, and RAMs such as the memory 16 and HDD 17 that are storage media are connected. In the memory 16, when the data are actually read by a line scanner of the image reading portion 10 and transferred to the image processing portion 12, the image data is kept in the memory 16 at a transfer speed and at the time of processing performed when, for example, reading is performed by the image reading portion 10 and when another processing is performed by the image processing portion 12. Thereafter, the image data is stored into the HDD 17 and used when reusing data, according to need.

The above has described the processing performed only for paper output, but the processing is performed when accumulating image data obtained by reading the document.

Next is described processing performed when the image data are accumulated without depending on the devices and then reused.

First, processing in which an image on the document is read and thus obtained image data is accumulated without depending on the devices is described.

The image reading portion 10 moves the position of the reading line in the sub-scanning direction of the document set on the contact glass or ADF, to read an image in the main scanning direction of the document, and outputs thus obtained image data on the read reading line to the read image correction portion 11. When reading the image using the image reading portion 10, the control unit 21 performs moving speed control on the image reading portion 10 so as to variably control the speed of optical unit moving on the document such that the moving speed of the document in its sub-scanning direction is made faster or slower than when normal reading is performed so that the resolution of the image data in the sub-scanning direction becomes a specified resolution.

The read image correction portion 11 performs the first conversion processing of converting the characteristics of the image data that is input from the image reading portion 10 into data characteristics that are determined beforehand at the time of accumulation. Specifically, the image data is converted into image data that does not depend on the devices. Examples of the data characteristics of the image data that does not depend on the devices include a color space such as sYCC, AdobeRGB space, and an RGB space that is commonly defined beforehand as equipment. Spatial frequencies are also defined, and the image data characteristics are converted to such data characteristics. Then, the image data expansion bus control unit 14 stores and accumulates the image data obtained after data characteristic conversion, into the HDD 17 via the memory 16.

Next is described processing of outputting the read image onto a paper by using the image data accumulated in the HDD 17.

The image data expansion bus control unit 14 reads out the image data accumulated in the HDD 17, once stores it in the memory 16, and outputs it to the image processing portion 12. The image processing portion 12 converts the input image data into device characteristics of a device to which the image data is input. Here, the conversion is targeted for print output performed by the image writing portion 13, thus the image data having data characteristics, which does not depend on the devices, is converted into image data having data characteristic corresponding to the characteristics of the image writing portion 13, and is then output to the image data expansion bus control unit 14. The image data expansion bus control unit 14 once stores the input image data in the memory 16 and then output to the image writing portion 13 which is the device to which the image device is input, whereby the image writing portion 13 prints out and outputs the image data onto a paper.

Next is described control processing performed when reducing the time for scanning the document placed on the document table in the digital copying machine 1.

When increasing the speed of reading the image on the document, the control unit 21 executes moving speed control processing on the image reading portion 10, and the image reading portion 10 reduces the number of lines reading the image data, whereby the speed of the document moving in the sub-scanning direction is made faster than a normal speed such that the resolution of the image data in the sub-scanning direction is reduced to the specified resolution. The time per unit time with respect to one main scanning line is constant, and the read resolution in the sub-scanning direction is reduced, whereby the number of reading lines is reduced. As a result, the time for reading one document is reduced.

In this manner, the speed of reading in the sub-scanning direction is increased to reduce the reading time such that the image reading portion 10 can read the image data at a resolution required to perform output. Then, the control unit 21 performs control and thereby causes the primary resolution conversion processing portion 34 of the read image correction portion 11 to perform conversion to make the resolution of the image data in the main scanning direction be equal to the resolution of the image data in the sub-scanning direction that is output from the image reading portion 10.

The primary resolution conversion processing portion 34 converts the resolution of the image data in the main scanning direction into the resolution for outputting the image data to the image writing portion 13 such that the resolution in the main scanning direction matches the resolution in the sub-scanning direction, and thus obtained image data is subjected to another image processing and then accumulated once in the HDD 17.

The image data accumulated in the HDD 17 is sent to the image processing portion 12, and the control unit 21 performs control so as not to cause the secondary resolution conversion processing portion 43 of the image processing portion 12 to perform secondary resolution conversion processing. Accordingly, in the secondary resolution conversion processing portion 43, the resolution of the image data is converted to a desired resolution in the previous processing, thus the image data is simply caused to pass and is subjected to another data processing in the image processing portion 12. Thereafter, the image data that is output from the image processing portion 12 is output to the image writing portion 13 via the memory 16, whereby print processing is performed.

By this operation, the time for scanning the document using the image reading portion 10 can be reduced.

Next is described control processing performed when improving the quality of the read image on the document placed on the document table in the digital copying machine 1.

First, the image region separation processing performed by the image region separation processing portion 30 of the read image correction portion 11 and filter processing performed by the filter processing portion 32 require matrix ranges of the image, thus the processing ability of each of these portions can be exercised by reading the image data at high resolution. Also, the accumulated image data can be used to perform two different ways of outputting the image: outputting the image as a color image onto a paper at the same magnification; and outputting the image as a reduced monochrome image onto a paper. In such cases, the image reading portion 10 and the read image correction portion 11 are controlled so that in the image reading portion 10 the image data can be output to the device at optimal data characteristics.

In this manner, when improving the read quality of the image of the document, the control unit 21 executes the moving speed control processing on the image reading portion 10, and the image reading portion 10 reads, at a normal speed, the speed of the document in the sub-scanning direction, without variably controlling the moving speed. Furthermore, the read image correction portion 11 executes processing on the portions other than the primary resolution conversion processing portion 34, and the control unit 21 performs control and causes the primary resolution conversion processing portion 34 of the read image correction portion 11 to not perform conversion on the image data. The color conversion processing portion 33 performs color conversion so as to obtain a predetermined RGB space, and accumulates the image data with such image characteristics in the HDD 17.

Thereafter, the control unit 21 performs control to output the image data accumulated in the HDD 17 in two different ways. In this case, the secondary resolution conversion processing portion 43 of the image processing portion 12 is caused to perform conversion so that the resolution of the image data in the main scanning direction becomes equal to the resolution of the image data in the sub-scanning direction, which is obtained when the image data is output from the image reading portion 10. For example, when an instruction is made to output the image data accumulated in the HDD 17 to the image writing portion 13 as a first color output, the compressed image data is extended by the extension processing portion 40 of the image processing portion 12, subjected to filter processing by the filter processing portion 41 in accordance with the color output, and subjected to color conversion by the color conversion processing portion 42 in accordance with the plotter characteristics of the image writing portion 13. Specifically, if, for example, the image writing portion 13 is a device for forming an image composed of CMYK, color conversion processing corresponding to the characteristics of this device is performed on the image data.

Thereafter, the secondary resolution conversion processing portion 43 converts the resolution of the image data to a resolution at which the image data is output to the image writing portion 13 at the same magnification. Then, the γ processing portion 44 and the halftone processing portion 45 perform own processing thereof to output the processed image data to the image writing portion 13, and the image writing portion 13 performs color print processing.

Next, when an instruction is made to output the image data accumulated in the HDD 17 as a second monochrome output, first the compressed image data is extended by the extension processing portion 40 of the image processing portion 12, and subjected to filter processing by the filter processing portion 41 in accordance with the monochrome output, and then the RGB image data is converted into K data by the color conversion processing portion 42.

Thereafter, the secondary resolution conversion processing portion 43 converts the resolution of the image data to a resolution at which the image data is output to the image writing portion 13 at the same magnification. Then, the γ processing portion 44 and the halftone processing portion 45 perform own processing thereof to output the processed image data to the image writing portion 13, and the image writing portion 13 performs monochrome print processing.

By this operation, the image reading portion 10 can scan the document at high quality.

The above has described the two different ways of outputting the image data to the image writing portion 13, but the same processing can be performed when using a plurality of ways of outputting the image data to the image writing portion 13 and other devices, or when outputting the image data to each of a plurality of devices.

Next is described processing of distributing the image data to the external PC 2 in the digital copying machine 1.

Figure 4:
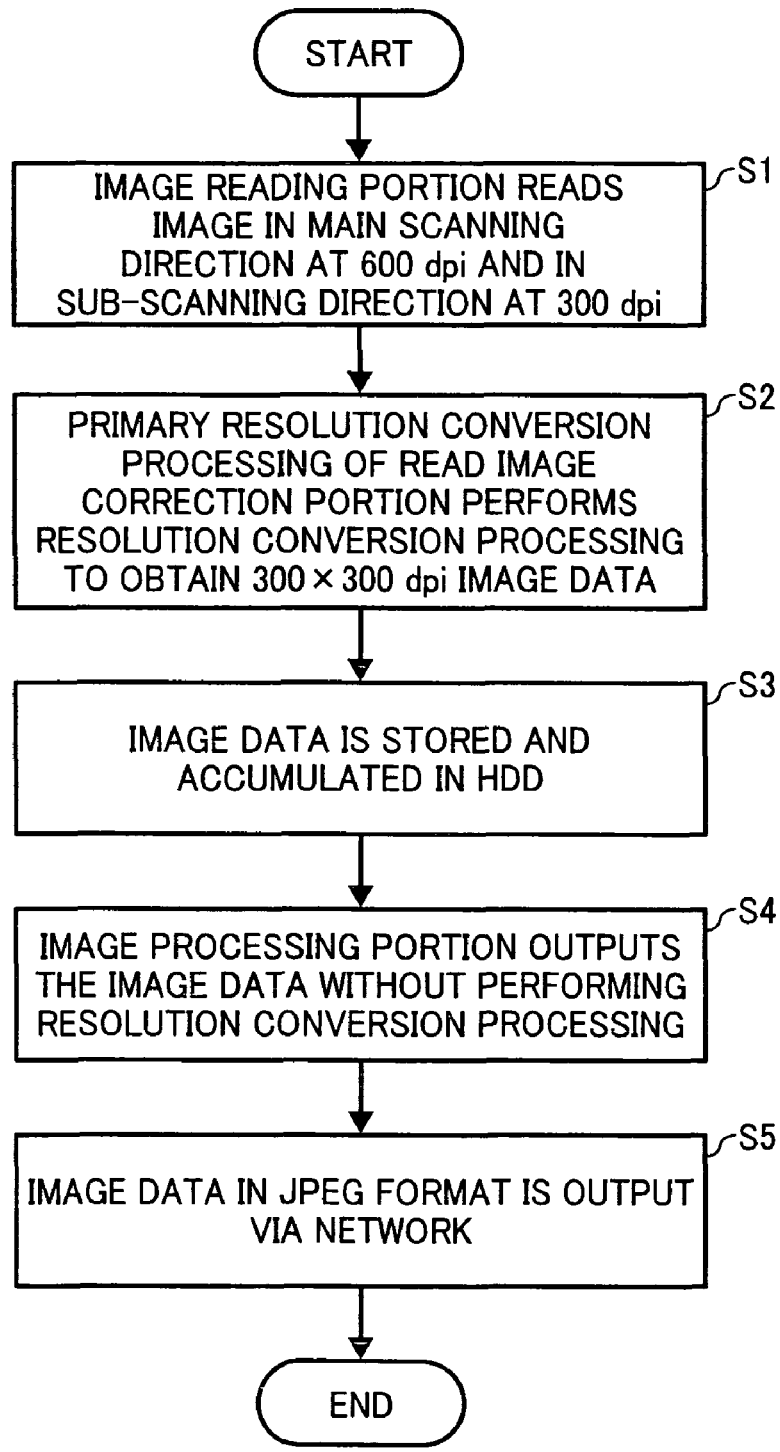
FIG. 4 is a flowchart showing processing in which the digital copying machine transfers JPEG image data of RGB format that has a resolution of 300 dpi to a PC through a network.

For example, FIG. 4 is used to describe processing of transferring JPEG image data having a resolution of 300 dpi and composed of RGB to the PC 2 via the network. Here, the image reading portion 10 is a device capable of reading an image in the main scanning direction of a document at a resolution of 600 (=m) dpi. There is described processing of increasing the speed of reading an image on the document when the image data read by the image reading portion 10 is output at a resolution of 300 (=n) dpi.

In Step (denoted by "S" in the figure) 1, control of the control unit causes the image reading portion to make the moving speed of the document in the sub-scanning direction be faster than the normal speed so that the image data can be read at a specified resolution of 300 dpi (=p), whereby the image reading portion reads the image at a resolution of 600 dpi in the main scanning direction of the document and at a resolution of 300 dpi in the sub-scanning direction, and outputs the image data to the read image correction portion. It should be noted that when using an ADF, the speed at which the image passes through the reading position is made faster than the speed at which the image is read at a resolution of 600 dpi, and the image can be read at 300-dpi resolution in the sub-scanning direction.

In this manner, the reading time can be reduced by increasing the speed of passage.

In Step 2, in the read image correction portion the image region separation processing portion extracts a distinctive area of the document on the basis of the image data, and outputs the extracted and image region separation data to the filter processing portion. On the other hand, the scanner γ processing portion performs image γ conversion to convert the γ characteristics of the image reading portion to the characteristics to be output, and outputs thus obtained characteristics to the filter processing portion. The filter processing portion performs processing so as to convert the spatial frequencies of the image data obtained from the scanner γ processing portion. Furthermore, the image region separation data obtained from the image region separation processing portion is used to perform distinctive filter processing on each extracted area of the image data.

Moreover, the color conversion processing portion performs color conversion processing corresponding to the output characteristics on the image data processed by the filter processing portion. For example, the color conversion processing portion converts the image data to universal RGB data and outputs it to the primary resolution conversion processing portion. The primary resolution conversion processing portion performs primary resolution conversion processing of converting the 600-dpi resolution of the image data in the main scanning direction to a specified resolution of 300 dpi, reduces the image data to 300×300 dpi, outputs it to the compression processing portion, and outputs the image region separation data obtained from the image region separation processing portion to the compression processing portion. The compression processing portion compresses the image data, which is an output from the primary resolution conversion processing portion, into a JPEG format, and compresses the image region separation data obtained from the image region separation processing portion by means of a reversible compression processing method.

In Step 3, the image data expansion bus control unit stores and accumulates the image data in the HDD.

In Step 4, the image data is read from the HDD and sent to the image processing portion. In the image processing portion, the extension processing portion extends the compressed image data and image region separation data, the filter processing portion converts the image data into data characteristics corresponding to the display of the PC, the color conversion processing portion converts the color space of the RGB data obtained when the image data is accumulated into an sRGB space, and the secondary resolution conversion processing portion is caused by the control of the control unit not to perform resolution conversion processing on the image data. Specifically, since the resolution of the image data is already a resolution desired by the user, i.e., 300 dpi, it is not necessary to operate the secondary resolution conversion processing portion. Moreover, the γ processing portion performs γ conversion to convert predetermined accumulated image characteristics to the output characteristics, and the halftone processing portion performs gradation processing in accordance with the characteristics of the display of the PC.

In Step 5, the image data processed by the image processing portion is once kept in the memory and then output to the PC 2 by a NIC using the network via the external I/F control unit.

The above has described the case in which m=600, p=300, and n=300, but the same processing can be performed even in the case of other values that can satisfy the relationship of m>p≧n>0.

By this operation, the image reading portion 10 can scan the document at high quality.

Figure 5:
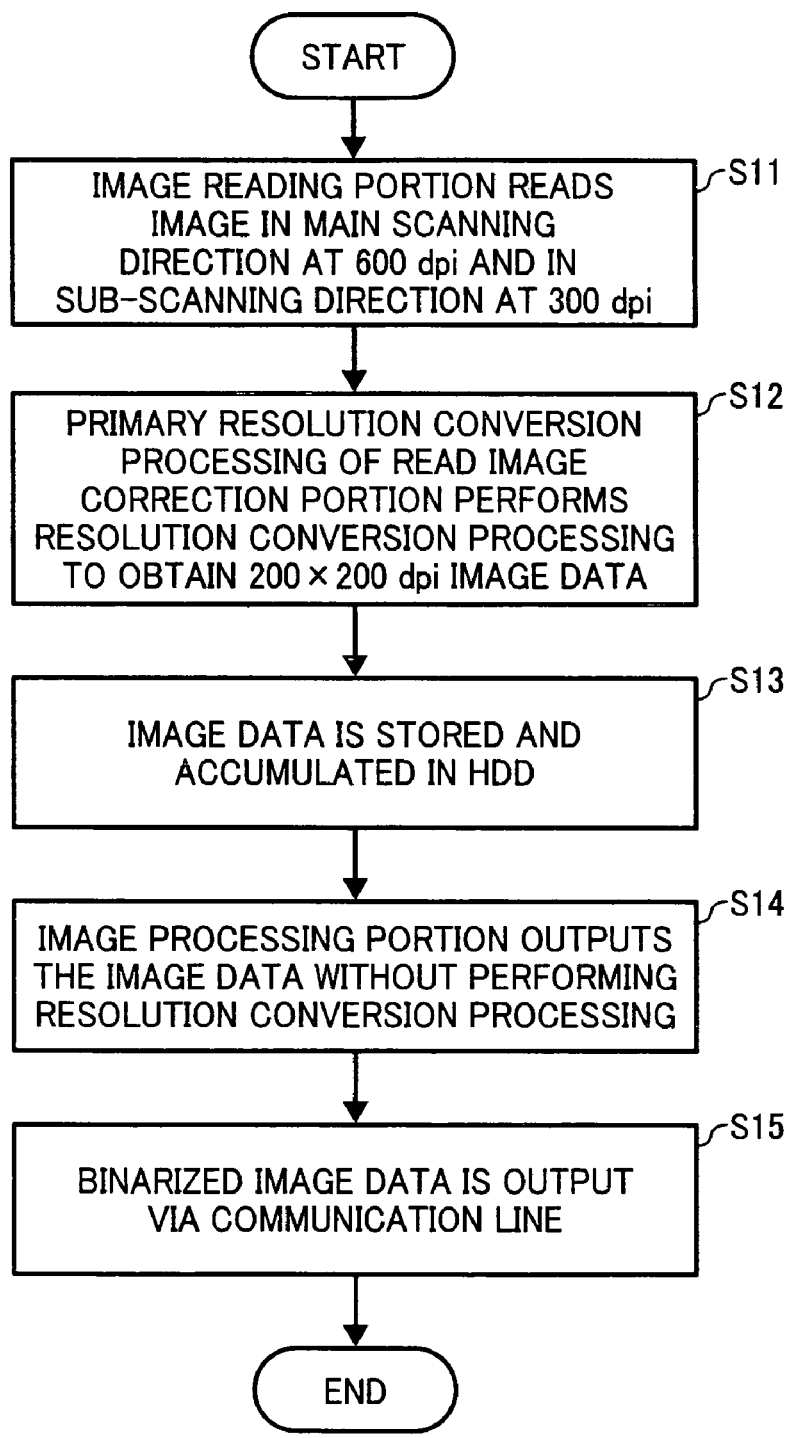
FIG. 5 is a flowchart showing processing in which the digital copying machine transmits binary image data having a resolution of 200 dpi by means of a facsimile.

Next, FIG. 5 is used to described processing performed when facsimile-transmitting binary image data with a resolution of 200 dpi in the digital copying machine 1.

Here, the image reading portion 10 is a device capable of reading an image in the main scanning direction of a document at a resolution of 600 (=m) dpi. There is described processing of increasing the speed of reading an image on the document when the image data read by the image reading portion 10 is output at a resolution of 200 (=n) dpi.

In Step (denoted by "S" in the figure) 11, control of the control unit causes the image reading portion to make the moving speed of the document in the sub-scanning direction be faster than the normal speed so that the image data can be read at a specified resolution of 300 dpi (=q), whereby the image reading portion reads the image at a resolution of 600 dpi in the main scanning direction of the document and at a resolution of 300 dpi in the sub-scanning direction, and outputs the image data to the read image correction portion. It should be noted that when using an ADF, the speed at which the image passes through the reading position is made faster than the speed at which the image is read at a resolution of 600 dpi, and the image can be read at 300-dpi resolution in the sub-scanning direction.

In this manner, the reading time can be reduced by increasing the speed of passage.

In Step 12, in the read image correction portion the image region separation processing portion extracts a distinctive area of the document on the basis of the image data, and outputs the extracted and image region separation data to the filter processing portion. On the other hand, the scanner γ processing portion performs image γ conversion to convert the γ characteristics of the image reading portion to the characteristics to be output, and outputs thus obtained characteristics to the filter processing portion. The filter processing portion performs processing so as to convert the spatial frequencies of the image data obtained from the scanner γ processing portion. Furthermore, the image region separation data obtained from the image region separation processing portion is used to perform distinctive filter processing on each extracted area of the image data.

Moreover, the color conversion processing portion performs color conversion processing corresponding to the output characteristics on the image data processed by the filter processing portion. For example, the color conversion processing portion converts the image data to universal RGB data and outputs it to the primary resolution conversion processing portion. The primary resolution conversion processing portion performs primary resolution conversion processing of converting the 600-dpi resolution of the image data in the main scanning direction and 300-dpi resolution of the image data in the sub-scanning direction to a specified resolution of 200 dpi (=p), reduces the image data to 200×200 dpi, and outputs it to the compression processing portion. The compression processing portion compresses the image data, which is an output from the primary resolution conversion processing portion, into a JPEG format, and compresses the image region separation data obtained from the image region separation processing portion by means of the reversible compression processing method.

In Step 13, the image data expansion bus control unit stores and accumulates the image data in the HDD.

In Step 14, the image data is read from the HDD and sent to the image processing portion. In the image processing portion, the extension processing portion extends the compressed image data and image region separation data, the filter processing portion converts the image data into data characteristics corresponding to the display of the PC, the color conversion processing portion converts the color space of the RGB data obtained when the image data is accumulated into K data, and the secondary resolution conversion processing portion is caused by the control of the control unit not to perform resolution conversion processing on the image data. Specifically, since the resolution of the image data is already a resolution desired by the user, i.e., 200 dpi, it is not necessary to operate the secondary resolution conversion processing portion. Moreover, the γ processing portion performs γ conversion to convert predetermined accumulated image characteristics to the output characteristics, and the halftone processing portion performs binarization processing on the image data to convert the image data into binary data.

In Step 15, the image data processed by the image processing portion is once kept in the memory and then facsimile-transmitted to a facsimile device or PC, which is a pre-specified destination, by the FAX portion using the communication line via the external I/F control unit.

Here, the resolution of the image data in the sub-scanning direction that is read by the image reading portion 10 is not 200 dpi but 300 dpi. However, for example, even if reading is performed with priority on the speed, when the image reading portion 10 itself is not capable of reading the image data at a resolution of 200 dpi, or when, for example, the ADF cannot sent the document promptly, or when a resolution of 300 dpi is required after the processing is performed, or when a resolution of 300 dpi or higher is required in the image region separation processing, it is necessary to read the image data at a resolution corresponding to the processability, thus the image data is read at the maximum speed corresponding to the reading ability, while increasing the reading speed.

The above has described the case in which m=600, q=300, p=200, and n=200, but the same processing can be performed even in the case of other values that can satisfy the relationship of m>q≧p≧n>0.

By this operation, the image reading portion 10 can scan the document at high quality.

Next is described processing of distributing the image data to the external PC 2 and of facsimile-transmitting the image data to the outside by reading the document once, in the digital copying machine 1.

Here, the image reading portion 10 is a device capable of reading an image in the main scanning direction of a document at a resolution of 600 (=m) dpi. There is described processing of outputting the image data read by the image reading portion 10 to the image writing portion 13 at a resolution of 300 (=n) dpi (color image obtained after 50% reduction), outputting the image data to the PC 2 as monochrome image data having a resolution of 200 (=p) dpi, and increasing the speed of reading an image on the document when the image data read by the image reading portion 10 is output at a resolution of 200 (=n) dpi.

First, the image reading portion 10 and the read image correction portion 11 read the image data to be output so as to obtain optimal resolutions for these portions. In this example, the image obtained after 50% reduction has a larger resolution, thus the image reading portion 10 is caused to perform reading operation so as to obtain a resolution of 300 dpi.

Control of the control unit 21 causes the image reading portion 10 to make the moving speed of the document in the sub-scanning direction be faster than the normal speed so that the image data can be read at a specified resolution of 300 dpi (=n), whereby the image reading portion 10 reads the image at a resolution of 600 dpi in the main scanning direction of the document and at a resolution of 300 dpi in the sub-scanning direction, and outputs the image data to the read image correction portion 11.

It should be noted that when using an ADF, the speed at which the image passes through the reading position is made faster than the speed at which the image is read at a resolution of 600 dpi, and the image can be read at 300-dpi resolution in the sub-scanning direction.

In this manner, the reading time can be reduced by increasing the speed of passage.

In the read image correction portion 11 the image region separation processing portion 30 extracts a distinctive area of the document on the basis of the image data, and outputs the extracted and image region separation data to the filter processing portion 32. On the other hand, the scanner γ processing portion 31 performs image γ conversion to convert the γ characteristics of the image reading portion 10 to the characteristics to be output, and outputs thus obtained characteristics to the filter processing portion 32. The filter processing portion 32 performs processing so as to convert the spatial frequencies of the image data obtained from the scanner γ processing portion 31. Furthermore, the image region separation data obtained from the image region separation processing portion 30 is used to perform distinctive filter processing on each extracted area of the image data.

Moreover, the color conversion processing portion 33 performs color conversion processing corresponding to the output characteristics on the image data processed by the filter processing portion. For example, the color conversion processing portion converts the image data to universal RGB data and outputs it to the primary resolution conversion processing portion 34. The primary resolution conversion processing portion then is controlled by the control unit 21 to output the image data to the compression processing portion 35 without performing resolution conversion on the image data. The compression processing portion 35 compresses the image data, which is an output from the color conversion processing portion, into a JPEG format, and compresses the image region separation data obtained from the image region separation processing portion 30 by means of the reversible compression processing method. Then, the image data expansion bus control unit 14 stores and accumulates the image data into the HDD 17 via the memory 16.

Thereafter, as a first output, the image data accumulated in the HDD 17 is first read and sent to the image processing portion 12, and the image processing portion 12 performs image processing on the image data so that the image writing portion 13 can print the image data, and outputs it to the image writing portion 13. First, the extension processing portion 40 extends the image data, the filter processing portion 41 performs filter processing corresponding to a color output to be output to the image writing portion 13, and the color conversion processing portion 42 performs color conversion corresponding to the plotter characteristics of the image writing portion 13. For example, if the image writing portion 13 is a device that forms an image composed of CMYK, the color conversion processing portion 42 performs color conversion processing corresponding the characteristics of the image writing portion 13.

Then, the control unit 21 performs control such that the secondary resolution conversion processing portion 43 performs secondary resolution conversion processing of making the 600-dpi resolution of the image data in the main scanning direction become equal to the 300-dpi resolution of the image data in the sub-scanning direction. The γ processing portion 44 and the halftone processing portion 45 perform the similar processing to output the image data to the image writing portion 13 so that the image data is printed out.

Next, as a second output, the image data accumulated in the HDD 17 is used again, and the image processing portion 12 performs processing of outputting the image data to the PC 2 and outputs the image data.

First, the extension processing portion 40 extends the image data, the filter processing portion 41 then performs filter processing corresponding to a monochrome output, and the color conversion processing portion 42 then converts RGB image data into K data. Thereafter, the secondary resolution conversion processing portion 43 performs secondary resolution conversion processing of converting the 600-dpi resolution of the image data in the main scanning direction and the 300-dpi resolution of the image data in the sub-scanning direction into a resolution of 200 dpi. The γ processing portion 44 and the halftone processing portion 45 perform the same processing as described above and output the image data to the PC 2.

The above has described the case in which m=600, n=300, and p=200, but the same processing can be performed even in the case of other values that can satisfy the relationship of $m \geq n > p > 0$.

Next is described control processing performed for improving the quality of the image on the document that is read once in the digital copying machine 1 when outputting the image to a plurality of devices.

Basically, the resolution at which the reading ability of the image reading portion 10 can be maximized in the image processing depends on the reading resolution of a CCD or the like. For example, when the image reading portion 10 has a line sensor having a resolution of 600 dpi, only image data having a resolution of 600 dpi is obtained even if image processing is performed at 800 dpi by means of computation processing.

Therefore, in order to improve the image quality, the reading resolution of the image reading portion 10 may be used as it is to read the document and accumulate the image data.

Figure 6:
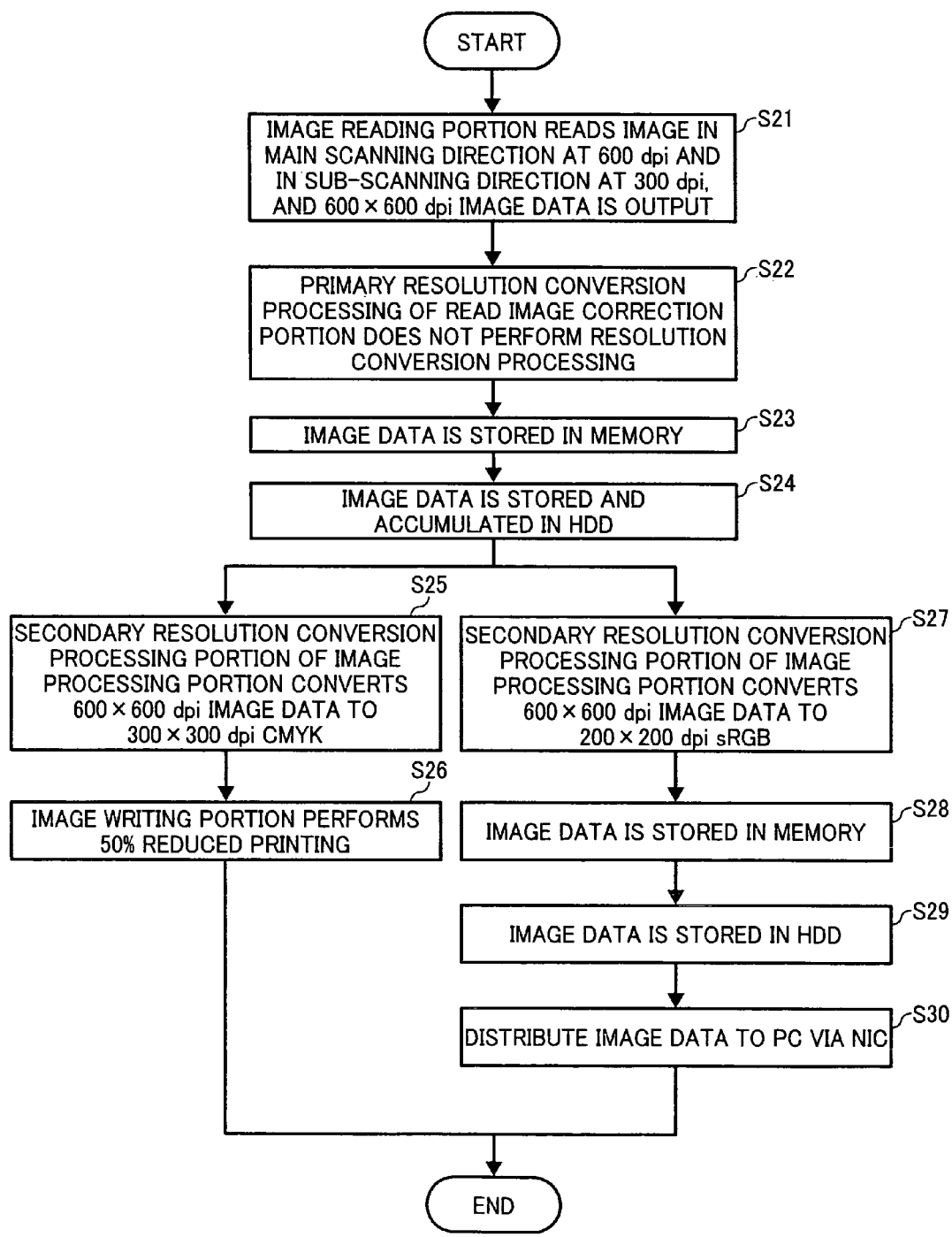
FIG. 6 is a flowchart showing processing in which the digital copying machine prints out read image data and distributes it to an external PC.

FIG. 6 is a flowchart showing processing of printing out read image data and distributing it to the external PC.

Here, the image reading portion 10 is a device capable of reading an image on the document in the main scanning direction at a resolution of 600 (=m) dpi. There is described processing of printing out the image data read by the image reading portion 10 at a resolution of 300 (=n) dpi and distributing it to the external PC 2 at a resolution of 200 dpi.

In Step 21, the control unit performs control and causes the image reading portion to make the moving speed of the document in the sub-scanning direction be faster than the normal speed so that the image data can be read at a resolution of 600 dpi (=m), whereby the image reading portion reads the image at a resolution of 600 dpi in the main scanning direction of the document and at a resolution of 600 dpi in the sub-scanning direction, and outputs the image data to the read image correction portion.

In Step 22, in the read image correction portion the image region separation processing portion extracts a distinctive area of the document on the basis of the image data, and outputs the extracted and image region separation data to the filter processing portion. On the other hand, the scanner γ processing portion performs image γ conversion to convert the γ characteristics of the image reading portion to the characteristics to be output, and outputs thus obtained characteristics to the filter processing portion. The filter processing portion performs processing so as to convert the spatial frequencies of the image data obtained from the scanner γ processing portion. Furthermore, the image region separation data obtained from the image region separation processing portion is used to perform distinctive filter processing on each extracted area of the image data.

Moreover, the color conversion processing portion performs color conversion processing corresponding to the output characteristics on the image data processed by the filter processing portion. For example, the color conversion processing portion converts the image data to universal RGB data and outputs it to the primary resolution conversion processing portion. The primary resolution conversion processing portion then is controlled by the control unit to output the image data to the compression processing portion without performing resolution conversion on the image data, and outputs the image region separation data obtained from the image region separation processing portion to the compression processing portion. The compression processing portion compresses the image data, which is an output from the primary resolution conversion processing portion, into a JPEG format, and compresses the image region separation data obtained from the image region separation processing portion by means of the reversible compression processing method.

In Step 23, the image data expansion bus control unit stores the image data in the memory, an in Step 24 the image data expansion bus control unit stores and accumulates the image data stored in the memory into the HDD.

In Step 25, the image data is read from the HDD and sent to the image processing portion. In the image processing portion, the extension processing portion extends the compressed image data and image region separation data, the filter processing portion performs filter processing corresponding to a color output, and the color conversion processing portion performs color conversion corresponding to the plotter characteristics of the image writing portion. For example, if the image writing portion 13 is a device that forms an image composed of CMYK, the color conversion processing portion performs color conversion processing corresponding to the characteristics of the image writing portion. Thereafter, in the secondary resolution conversion processing portion, for example, the 600-dpi resolution of the image data in the main scanning direction and the 600-dpi resolution of the image data in the sub-scanning direction are converted into a CMYK having a resolution of 300 dpi, in order to perform specified 50% reduced printing, and the γ processing portion and the halftone processing portion perform own processing thereof to output the processed image data to the image writing portion.

In Step 26, the image writing portion performs 50% reduced color print processing based on the image data that is input from the image processing portion.

On the other hand, in Step 27, the extension processing portion of the image processing portion extends the compressed image data and image region separation data. The filter processing portion converts the image data into data characteristics corresponding to the display of the PC. The color conversion processing portion converts the image data to from the color space of the RGB data obtained when the image data is accumulated into the sRGB space. The secondary resolution conversion processing portion is controlled by the control unit to convert the 600-dpi resolution of the image data in the main scanning direction and the 600-dpi resolution of the image data in the sub-scanning direction to a resolution of 300 dpi. The γ processing portion and the halftone processing portion perform own processing thereof, whereby the processed data is output to the image data expansion bus control unit.

In Step 28, the image data is stored in the memory. In Step 29, the image data is stored and accumulated in the HDD. In Step 30, the image data is output to the PC 2 by the NIC using the network via the external I/F control unit.

In this manner, by reading the image data at a resolution of 600 dpi, an image information amount at which the performance of the image reading portion 10 can be maximized is obtained. Therefore, when performing the image region separation processing or filter processing as well, results of the processing can be obtained more effectively by using the data.

In the digital copying machine 1, the image data read by the image reading portion is subjected to processing, and is stored once. When the stored image data is subjected to image processing and then output, the processing function capable of converting the resolution of the image data before or after storing the image data is provided, whereby the reading speed can be increased, the image data processability can be improved, and the image can be read in two different ways, improving the productivity of image reading.

Furthermore, even if there are a plurality of devices to which the image data read by the image reading portion is output, by reading the image data once, the resolution of the image data is converted into a resolution corresponding to the characteristics of each of the devices to which the image data is output, and then the image data is output to these devices, thus the image data can be provided to the user while maximizing the production capability of image reading without reducing the productivity of image reading. Also, the reading speed can be increased as much as possible to provide image data having maximized processability.

Moreover, the resolution conversion function is used in image processing performed after accumulating the read image data, whereby the scanned image data can be fully utilized.

The image processing apparatus and image processing method of the present invention can be applied to a desktop computer, a laptop computer, and other personal computers.

The image processing apparatus and image processing method of the present invention can improve the productivity of image reading.

Various modifications will become possible for those skilled in the art after receiving the teachings of the present disclosure, without departing from the scope thereof.

What is claimed is:

1. An image processing apparatus, comprising:
an optical reading unit configured to move a position of a reading line in a sub-scanning direction of a document to read an image in a main scanning direction of the document and then to output image data on the read reading line;
a drive circuit configured to variably control a speed of the optical reading unit moving in the sub-scanning direction of the document so that a resolution of the image data in the sub-scanning direction becomes a specified resolution;
a first conversion unit configured to convert characteristics of the image data output from the optical reading unit into data characteristics determined at a time of accumulation of the image data, the data characteristics being variable and based on a device to which the image data is output;
a compression processing unit configured to compress the image data converted by the first conversion unit;
a storage device configured to accumulate the image data compressed by the compression processing unit;
an extension processing unit configured to extend the compressed image data;
a second conversion unit configured to convert the characteristics of the image data extended by the extension processing unit into device characteristics of the device to which the image data is output;
an external interface control unit configured to output the image data converted by the second conversion unit to the device to which the image data is output; and
a control unit configured to perform control so as to, when increasing the speed of reading the image on the document, cause the drive circuit to make the speed of the optical reading unit moving in the sub-scanning direction of the document become faster than a normal speed so as to reduce the resolution of the image data in the sub-scanning direction to the specified resolution by causing the optical reading unit to reduce a number of lines for reading the image data, cause a primary resolution conversion unit to perform conversion so as to make the resolution of the image data in the main scanning direction become equal to the resolution of the image data in the sub-scanning direction, the image data being output from the optical reading unit, and cause a secondary resolution conversion unit not to perform conversion,
wherein the first conversion unit is provided with the primary resolution conversion unit configured to convert the resolution of the image data in the main scanning direction or the sub-scanning direction into the specified resolution, and the second conversion unit is provided with the secondary resolution conversion unit configured to convert the resolution of the image data in the main scanning direction or the sub-scanning direction into the specified resolution.

2. The image processing apparatus as claimed in claim 1, wherein
the control unit is configured to perform control so as not to, when improving reading quality of the image on the document, cause the drive circuit to perform variable control and not to cause the primary resolution conversion unit to perform conversion, but to cause the secondary resolution conversion unit to perform conversion so as to make the resolution of the image data in the main scanning direction become equal to the resolution of the image data in the sub-scanning direction, the image data being output from the optical reading unit.

3. The image processing apparatus as claimed in claim 1, wherein the optical reading unit reads the image in the main scanning direction of the document at a resolution of m dpi, and the control unit is configured to cause, when outputting the image data at a specified resolution of n dpi, the drive circuit to change the speed of the optical reading unit moving in the sub-scanning direction of the document so as to cause the optical reading unit to read the image data at a specified resolution of p dpi when increasing the speed of reading the image on the document, cause the primary resolution conversion unit to perform conversion so as to make the resolution m of the image data in the main scanning direction become equal to the resolution p dpi of the image data in the sub-scanning direction, the image data being output from the optical reading unit, and cause the secondary resolution conversion unit not to perform conversion, to perform each of the control ($m > p \geq n > 0$).

4. The image processing apparatus as claimed in claim 1, wherein the optical reading unit reads the image in the main scanning direction of the document at a resolution of m dpi, and the control unit is configured to cause, when outputting the image data at a specified resolution of n dpi, the drive circuit to change the speed of the optical reading unit moving in the sub-scanning direction of the document so as to cause the optical reading unit to read the image data at a specified resolution of q dpi when increasing the speed of reading the image on the document, cause the primary resolution conversion unit to convert the resolution m dpi of the image data in the main scanning direction and the resolution q dpi of the image data in the sub-scanning direction into a resolution of p dpi, the image data being output from the optical reading unit, and cause the secondary resolution conversion unit not to perform conversion, to perform each of the control ($m > q \geq p \geq n > 0$).

5. The image processing apparatus as claimed in claim 1, wherein the optical reading unit reads the image in the main scanning direction of the document at a resolution of m dpi, and the control unit is configured to cause, when outputting the image data at two specified resolutions n dpi and p dpi, the drive circuit to change the speed of the optical reading unit moving in the sub-scanning direction of the document so as to cause the optical reading unit to read the image data at a specified resolution of n dpi, cause the primary resolution conversion unit not to perform conversion, and cause the secondary resolution conversion unit to perform conversion so as to make the resolution m of the image data in the main scanning direction become equal to the resolution n dpi of the image data in the sub-scanning direction, the image data being accumulated in the storage device, and convert the resolution m dpi of the image data in the main scanning direction and the resolution n dpi of the image data in the sub-scanning direction into the resolution of p dpi, the image data being accumulated in the storage device, to perform each of the control ($m \geq n > p > 0$).

6. The image processing apparatus as claimed in claim 1, wherein the optical reading unit reads the image in the main scanning direction of the document at a resolution of m dpi, and the control unit configured to cause, when improving reading quality of the image on the document, the drive circuit to change the speed of the optical reading unit moving in the sub-scanning direction of the document so as to cause the optical reading unit to read the image data at a resolution of m dpi ($m > 0$), cause the primary resolution conversion unit not to perform conversion, and cause causing the secondary resolution conversion unit to convert the resolution m dpi of the image data in the main scanning direction and the resolution m dpi of the image data in the sub-scanning direction into a specified resolution, the image data being accumulated in the storage device.

7. An image processing method, comprising:

moving a position of a reading line in a sub-scanning direction of a document to read an image in a main scanning direction of the document and then to output image data on the read reading line;

variably controlling a speed of moving in the sub-scanning direction of the document so that a resolution of the image data in the sub-scanning direction becomes a specified resolution;

first converting characteristics of the image data output into data characteristics determined at a time of accumulation of the image data, the data characteristics being variable and based on a device to which the image data is output;

compressing the first converted image data;

accumulating the compressed image data;

extending the accumulated image data;

second converting the characteristics of the extended image data into device characteristics of the device to which the image data is output;

outputting the image data converted in the second conversion to the device to which the image data is output; and performing control so as to, when increasing the speed of reading the image on the document, cause the variable controlling to make the moving speed in the sub-scanning direction of the document become faster than a normal speed so as to reduce the resolution of the image data in the sub-scanning direction to the specified resolution by causing the moving to reduce a number of lines for reading the image data, cause a primary resolution conversion to perform conversion so as to make the resolution of the image data in the main scanning direction become equal to the resolution of the image data in the sub-scanning direction, the image data being output in the moving, and cause the secondary resolution conversion not to perform conversion, wherein the first conversion is provided with the primary resolution conversion converting the resolution of the image data in the main scanning direction or the sub-scanning direction into the specified resolution, and the second conversion is provided with a secondary resolution conversion converting the resolution of the image data in the main scanning direction or the sub-scanning direction into the specified resolution.

8. The image processing method as claimed in claim 7, wherein the control is performed, when improving reading quality of the image on the document, so as not to cause the variable controlling and not to cause the primary resolution conversion to perform conversion, but to cause the secondary resolution conversion to perform conversion so as to make the resolution of the image data in the main scanning direction become equal to the resolution of the image data in the sub-scanning direction, the image data being output by the moving.

9. The image processing method as claimed in claim 7, wherein the moving includes reading the image in the main scanning direction of the document at a resolution of m dpi, the image processing method further includes, when outputting the image data at a specified resolution of n dpi, causing the variable controlling to change the speed of moving in the sub-scanning direction the document so as to cause the moving to read the image data at a specified resolution of p dpi when increasing the speed of reading the image on the document, and causing the primary resolution conversion to perform conversion so as to make the resolution m of the image data in the main scanning direction become equal to the resolution p dpi of the image data in the sub-scanning direction, the image data being output in the moving, and causing the secondary resolution conversion not to perform conversion, to perform each of the control ($m > p \geq n > 0$).

10. The image processing method as claimed in claim 7, wherein the moving includes reading the image in the main scanning direction of the document at a resolution of m dpi, the image processing method further includes, when outputting the image data at a specified resolution of n dpi, causing the variable controlling to change the speed of moving in the sub-scanning direction the document so as to cause the moving to read the image data at a specified resolution of q dpi when increasing the speed of reading the image on the document, and causing the primary resolution conversion to convert the resolution m dpi of the image data in the main scanning direction and the resolution q dpi of the image data in the sub-scanning direction into a resolution of p dpi, the image data being output in the moving, and causing the secondary resolution conversion not to perform conversion, to perform each of the control ($m > q \geq p \geq n > 0$).

11. The image processing method as claimed in claim 7, wherein the moving includes reading the image in the main scanning direction of the document at a resolution of m dpi, the image processing method further includes, when outputting the image data at two specified resolutions n dpi and p dpi, causing the variable controlling to change the speed of moving in the sub-scanning direction the document so as to cause the moving to read the image data at a specified resolution of n dpi, and causing the primary resolution conversion not to perform conversion, and causing the secondary resolution conversion to perform conversion so as to make the resolution m of the image data in the main scanning direction become equal to the resolution n dpi of the image data in the sub-scanning direction, the image data being accumulated in the accumulating, and to convert the resolution m dpi of the image data in the main scanning direction and the resolution n dpi of the image data in the sub-scanning direction into the resolution of p dpi, the image data being accumulated in the accumulating, to perform each of the control ($m \geq n > p > 0$).

12. The image processing method as claimed in claim 7, wherein the moving includes reading the image in the main scanning direction of the document at a resolution of m dpi, the image processing method further includes, when improving reading quality of the image on the document, causing the variable controlling to change the speed of moving in the sub-scanning direction the document so as to cause the moving to read the image data at a resolution of m dpi ($m > 0$), and causing the primary resolution conversion not to perform conversion, and causing the secondary resolution conversion to convert the resolution m dpi of the image data in the main scanning direction and the resolution m dpi of the image data in the sub-scanning direction into a specified resolution, the image data being accumulated by the accumulating.

* * * * *